(12) United States Patent
Shen et al.

(10) Patent No.: US 9,891,140 B2
(45) Date of Patent: Feb. 13, 2018

(54) SIMULATION SYSTEM FOR CURRENT COLLECTING SURFACE OF C-TYPE CONTACT RAIL

(71) Applicant: CRRC QINGDAO SIFANG CO., LTD., Qingdao, Shandong (CN)

(72) Inventors: Huabo Shen, Shandong (CN); Yuye Ma, Shandong (CN); Qunjiang Zhu, Shandong (CN); Shun Xu, Shandong (CN); Jun'e Jing, Shandong (CN); Chenyang Bing, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 23 days.

(21) Appl. No.: 15/119,373

(22) PCT Filed: Oct. 27, 2015

(86) PCT No.: PCT/CN2015/092950
§ 371 (c)(1),
(2) Date: Aug. 16, 2016

(87) PCT Pub. No.: WO2016/074564
PCT Pub. Date: May 19, 2016

(65) Prior Publication Data
US 2017/0052093 A1    Feb. 23, 2017

(30) Foreign Application Priority Data
Nov. 11, 2014  (CN) .......................... 2014 1 0631460

(51) Int. Cl.
*G01M 17/08*     (2006.01)
*B60M 5/00*      (2006.01)
(Continued)

(52) U.S. Cl.
CPC ............ *G01M 17/08* (2013.01); *B60M 1/302* (2013.01); *B60M 5/00* (2013.01); *E01B 5/02* (2013.01)

(58) Field of Classification Search
CPC ........ B60M 1/307; B60M 1/302; B60M 5/00; E01B 5/02; G01M 17/08
See application file for complete search history.

(56) References Cited

U.S. PATENT DOCUMENTS 3,806,672 A * 4/1974 Landis ..................... B60M 1/04
                                                       191/30
4,318,462 A * 3/1982 Weinhaus ................ B60M 1/30
                                                       191/30
(Continued)

FOREIGN PATENT DOCUMENTS

CN    2170873 Y    7/1994
CN    2545010 Y    4/2003
(Continued)

OTHER PUBLICATIONS

Summary of the Chinese 1st Office Action for CN201410631460.4, dated Jun, 27, 2016.
(Continued)

*Primary Examiner* — Freddie Kirkland, III
(74) *Attorney, Agent, or Firm* — U.S. Fairsky LLP; Yue Xu

(57) ABSTRACT

A simulation system for a current collecting surface of a C-shaped contact rail includes a double-headed rail and a limiting plate. A current collecting end surface of the double-headed rail has a same current collection area as an actual C-shaped contact rail. The limiting plate matches the inner contour of the C-shaped contact rail. A constructed test line can simulate the current collecting status of the C-shaped contact rail. The limiting plate and the existing double-headed rail are combined, and compared with reproduction (Continued)

of the C-shaped contact rail, the manufacturing cycle is short, the costs are low, and it is applicable to the test line.

17 Claims, 3 Drawing Sheets

(51) Int. Cl.
 *E01B 5/02* (2006.01)
 *B60M 1/30* (2006.01)

(56) References Cited

U.S. PATENT DOCUMENTS

| | | | | |
|---|---|---|---|---|
| 4,888,454 | A * | 12/1989 | Scarpatetti | B60M 1/34 |
| | | | | 191/23 R |
| 5,590,504 | A * | 1/1997 | Heard | G09F 7/18 |
| | | | | 248/218.4 |
| 6,572,390 | B2 * | 6/2003 | Ladin | B60M 1/04 |
| | | | | 439/92 |
| 6,672,441 | B1 * | 1/2004 | Uremovic | B60M 1/307 |
| | | | | 191/22 R |
| 7,703,589 | B2 * | 4/2010 | Kalitzki | B60M 1/307 |
| | | | | 191/22 R |
| 7,926,634 | B1 * | 4/2011 | Morales | B60M 1/04 |
| | | | | 191/29 R |
| 2003/0036294 | A1 * | 2/2003 | Ladin | B60M 1/04 |
| | | | | 439/72 |

FOREIGN PATENT DOCUMENTS

| | | |
|---|---|---|
| CN | 1568562 A | 1/2005 |
| CN | 2716061 Y | 8/2005 |
| CN | 1882747 A | 12/2006 |
| CN | 200948753 Y | 9/2007 |
| CN | 201530332 U | 7/2010 |
| CN | 101856980 A | 10/2010 |
| CN | 202685992 U | 1/2013 |
| CN | 103112357 A | 5/2013 |
| CN | 104019712 A | 9/2014 |
| CN | 104359690 A | 2/2015 |
| EP | 1759914 A1 | 3/2007 |
| KR | 20110053714 A | 5/2011 |

OTHER PUBLICATIONS

The third rail subway and its measuring system by the inverter, Chen Lianbin, p. 52-55, Jan. 2005.
International Search Report for PCT/CN2015/092950 dated Feb. 1, 2016, ISA/CN.

* cited by examiner

SIMULATION SYSTEM FOR CURRENT COLLECTING SURFACE OF C-TYPE CONTACT RAIL

This application is a National Phase entry of PCT Application No. PCT/CN2015/092950, filed Oct. 27, 2015, which claims the benefit of priority to Chinese Patent Application No. 201410631460.4, titled "SIMULATION SYSTEM FOR CURRENT COLLECTING SURFACE OF C-SHAPED CONTACT RAIL", filed with the Chinese State Intellectual Property Office on Nov. 11, 2014, the entire disclosure of which are incorporated herein by reference.

FIELD

The present application relates to the field of rail vehicle test, and particularly to a simulation system for a current collecting surface of a C-shaped contact rail.

BACKGROUND

A contact rail, also referred to as a third rail, is a system laid along a line for supplying electrical energy to an electric vehicle. In order to ensure safety and reliability of a train before being formally delivered to operation, a series of tests are required to be applied on the train in a test line, which includes a test for the power supply system.

In the power supply system, the contact rail supplies power to the train, and the train collects current via a collector shoe. Currently, in actual lines, the contact rail is an early steel C-shaped rail, production of this kind of contact rails has been stopped domestically at present, and re-production of the C-shaped contact rails will definitely result in a long production cycle, high cost and inapplicability to the test line. Hence, it is urgent to provide a simulation system to replace the C-shaped contact rail for testing the positional relationship between a collector shoe of a current collector of a newly manufactured train and an actual contact rail, and the matching status therebetween in dynamic current collecting condition on the test line.

SUMMARY

An object of the present application is to provide a simulation system for a current collecting surface of a C-shaped contact rail, which avoids the problems of a long production cycle, high cost and inapplicability to a test line of a C-shaped contact rail resulted from using the C-shaped contact rail.

A simulation system for a current collecting surface of a C-shaped contact rail is provided according to the present application, which includes an I-rail and a limiting plate, and, a lower surface of the H-shaped rail includes a first plane and a second plane, the first plane is parallel to a horizontal plane, the second plane intersects with the first plane at a first preset angle, the first plane has a specified length, the limiting plate includes a first support, a second support, and a third support which is perpendicular to the horizontal plane, the first support has a first end fixed to the third support and a second end suspended, and the first support keeps level; the second support has a first end fixed to the third support, and the second support intersects with the horizontal plane at a second preset angle; and the first support is spaced from the second support by a specified distance, and an upper surface of the H-shaped rail is fixedly connected to a lower surface of the first support.

Preferably, the first preset angle is 176 degrees.
Preferably, the specified length is 47 mm.

Preferably, the H-shaped rail is a steel-aluminum composite H-shaped rail.

Preferably, the lower surface of the H-shaped rail is made of steel.

Preferably, the specified distance is 190 mm.

Preferably, the second end of the first support further includes a bent portion bending downwards.

Preferably, the limiting plate further includes a fourth support, the fourth support has a first end horizontally fixed to the third support and a second end suspended, and an extending direction from the first end to the second end of the fourth support is opposite to an extending direction from the first end to the second end of the first support.

Preferably, the limiting plate is made of glass fiber reinforced plastic.

Preferably, the second preset angle is 5 degrees.

Therefore, the present application has the following beneficial effects. The simulation system for a current collecting surface of a C-shaped contact rail according to the present application consists of the H-shaped rail and the limiting plate which can simulate a C-shaped contact rail. In the present application, the current collecting end surface of the H-shaped rail has the same current collecting area as an actual C-shaped contact rail; and the limiting plate matches with an outline of an inner contour of the C-shaped contact rail, therefore the test line can well simulate the current collecting situation of a train under the condition of a C-shaped contact rail. The simulation system for the current collecting surface of the C-shaped contact rail according to the present application uses the combination of the limiting plate and a conventional H-shaped rail, and has a short production cycle, a low cost, and an applicability to the test line compared with the solution of re-producing a C-shaped contact rail which has been discontinued.

BRIEF DESCRIPTION OF THE DRAWINGS

For more clearly illustrating embodiments of the present application or technical solutions in the conventional technology, drawings referred to describe the embodiments or the conventional technology will be briefly described hereinafter. Apparently, the drawings of the present application in the following description are only some examples of the present application, and for the person skilled in the art, other drawings may be obtained based on these drawings without any creative efforts.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

A simulation system for a current collecting surface of a C-shaped contact rail is provided according to the present application, which avoids the problems of long production cycle, high cost and inapplicability to a test line of a C-shaped contact rail resulted from using the C-shaped contact rail.

For those skilled in the art to better understand solutions of the present application, the present application is described in detail hereinafter in conjunction with drawings and embodiments.

Figure 1:
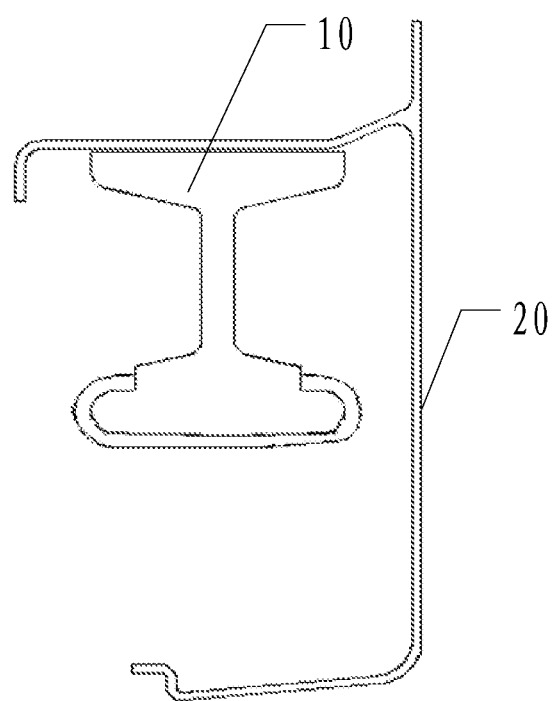
FIG. 1 is a schematic view showing the structure of a simulation system for a current collecting surface of a C-shaped contact rail according to the present application.

Referring to FIG. 1, a simulation system of a current collecting surface of a C-shaped contact rail according to an embodiment of the present application includes an H-shaped rail 10 and a limiting plate 20.

Figure 2:
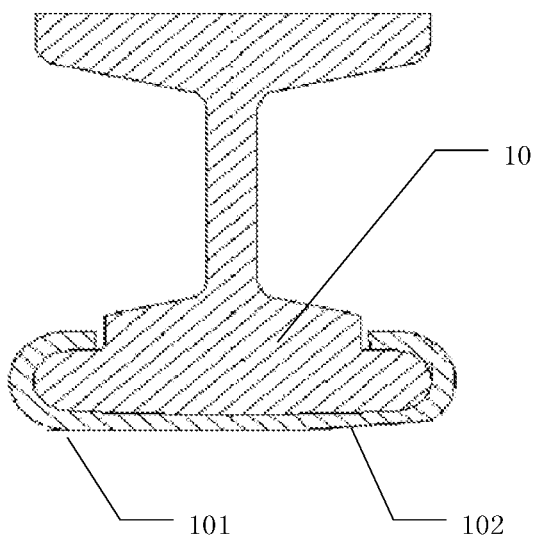
FIG. 2 is a schematic view showing the structure of an H-shaped rail of the simulation system for the current collecting surface of the C-shaped contact rail according to the present application.

In a solution according to the present application, referring to FIG. 2, a lower surface of the H-shaped rail 10 is formed by a first plane 101 and a second plane 102 intersecting with each other. An included angle formed between the intersecting first plane 101 and second plane 102 is a first preset angle. Here, the first plane 101 is parallel to the horizontal plane, and the first plane 101 has a fixed length.

Figure 3:
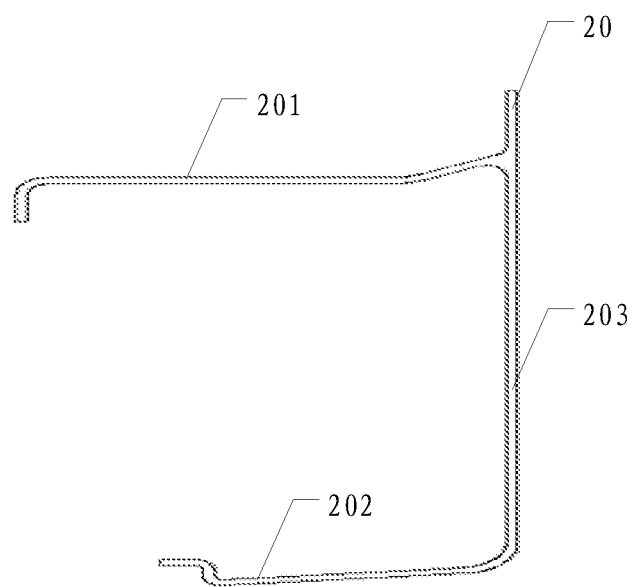
FIG. 3 is a schematic view showing the structure of a limiting plate of the simulation system for the current collecting surface of the C-shaped contact rail according to the present application.

In this solution, referring to FIG. 3, the limiting plate 20 consists of three supports, including a first support 201, a second support 202, and a third support 203 which is perpendicular to the horizontal plane.

The respective structure of the three supports of the limiting plate 20 and the connecting relationship therebetween are as follows. The first support 201 has a first end fixed to the third support 203, and has a second end suspended, and the first support 201 keeps level. The second support 202 has a first end fixed to the third support 203, and the second support 202 is arranged at a specified angle, i.e., a second preset angle, with respect to the horizontal plane, and the second preset angle may be 5 degrees.

A distance between the first support 201 and the second support 202 is a specified value, which is greater than the height of the H-shaped rail 10.

The H-shaped rail 10 and the limiting plate 20 are connected to each other in such a manner that an upper surface of the H-shaped rail 10 is fixedly connected to a lower surface of the first support 201 of the limiting plate 20.

The simulation system for the current collecting surface of the C-shaped contact rail according to this embodiment consists of the H-shaped rail 10 and the limiting plate 20 which can simulate a C-shaped contact rail. In the present application, the current collecting end surface of the H-shaped rail 10 has the same current collecting area as an actual C-shaped contact rail. Furthermore, after the limiting plate 20 and the H-shaped rail 10 are assembled and connected, the outline of the assembly of the limiting plate 20 and the H-shaped rail 10 matches with an outline of an inner contour of a C-shaped contact rail.

On this basis, the simulation system according to the present application mounted on a test line can well simulate the current collecting situation of a train under the condition of a C-shaped contact rail. The simulation system for the current collecting surface of the C-shaped contact rail according to the present application uses the combination of the limiting plate 20 and a conventional H-shaped rail 10, and has a short production cycle, a low cost, and an applicability to the test line compared with the solution of re-producing a C-shaped contact rail which has been discontinued.

In a specific embodiment, the first preset angle between the first plane 101 and the second plane 102 is 176 degrees, i.e., an included angle between the second plane 102 and the horizontal plane is 4 degrees.

With such an angle, it is not required to reduce the thickness of the second plane 102 of the lower surface of the H-shaped rail 10 by a large margin, thereby not only ensuring the strength of the H-shaped rail 10 itself, but also allowing an effective current collecting area of the H-shaped rail 10 to be same as an effective current collecting area of a C-shaped contact rail.

Based on the above embodiments, the first plane 101 has a length of 47 mm, in this way, the length of the first plane 101 matches with the length of a current collecting end surface of the C-shaped contact rail, thereby realizing an accurate simulation of the current collecting end surface of the C-shaped contact rail. Test data obtained during testing the current collecting situation of the train in the test line are more accurate.

Apparently, in a specific embodiment, the H-shaped rail 10 is embodied as a relatively common steel-aluminum composite H-shaped rail, which further saves the cost and shorten the production cycle.

Based on the above embodiments, each of the first plane 101 and the second plane 102 of the lower surface of the H-shaped rail 10 according to an embodiment of the present application is a steel plane, has a large rigidity, and is not easy to be deformed, and is not easy to be damaged by an external force, thus the service life of the H-shaped rail is prolonged.

In another embodiment according to the present application, the distance between the first support 201 and the second support 202 of the limiting plate 20 is a specified value, which conforms to a geometrical dimension of an inner contour of the C-shaped contact rail. In this way, it is better to test whether a phenomenon of exceeding the boundary or scraping the collector shoe occurs during the operation of the train. In the case that the H-shaped rail 10 is a standard H-shaped rail, since the distance between the lower surface of the H-shaped rail 10 and the second support 202 is 86 mm, the distance between the first support 201 and the second support 202 is 190 mm.

Apparently, the distance between the first support 201 and the second support 202 may also be set as other values according to various types of H-shaped rails.

It is to be noted that, the distance between the first support 201 and the second support 202 may be understood as the distance between the lower surface of the first support 201 and an upper surface of the second support 202, and may also be understood as the distance between a central point of the first support 201 and a central point of the second support 202.

Further, since the second support 202 is not a horizontal line, the distance between the lower surface of the first support 201 and the upper surface of the second support 202 may be referred to as the distance between a lower surface of the second end of the first support 201 and an upper surface of the second end of the second support 202.

In other embodiments according to the present application, the second end of the first support 201 of the limiting plate 20 further has a bent portion bending downwards, which achieves a good insulation effect.

Based on the above embodiments, the limiting plate 20 may be made of glass fiber reinforced plastic. The glass fiber reinforced plastic has a good rigidity, and is a good insulation material, and thus is adopted as the material of the limiting plate 20, which well insulates the current collecting portion of the train from the environment. Thus the safety is better.

Figure 4:
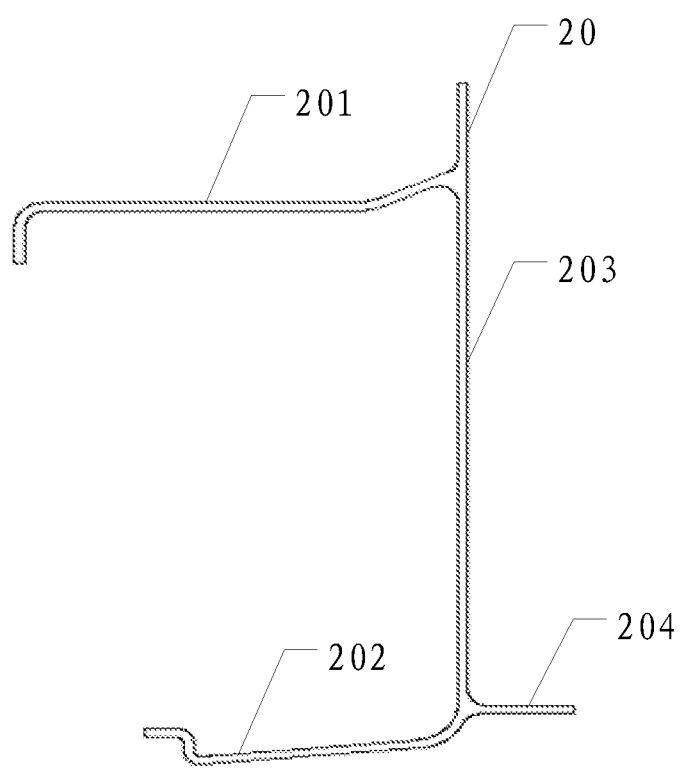
FIG. 4 is a schematic view showing the structure of another simulation system for the current collecting surface of the C-shaped contact rail according to the present application.

In another embodiment according to the present application, referring to FIG. 4, the limiting plate 20 further includes a fourth support 204. The extending direction from a first end to a second end of the fourth support 204 is opposite to the extending direction from the first end to the second end of the first support 201. In this way, the fourth support 204 may fix the whole simulation system. To fix the simulation system, it is simply required to fix the fourth support 204 to the test line. Furthermore, the fourth support 204 may further function as a reinforcing rib, which prevents the simulated C-shaped contact rail from being deformed.

On the basis of the above embodiments, the included angle between the second support 202 and the horizontal plane, i.e., the second preset angle, is a specified value, which conforms to a geometrical configuration of an inner contour of the C-shaped contact rail.

A simulation system for a current collecting surface of a C-shaped contact rail according to the present application is described in detail hereinbefore. The principle and the embodiments of the present application are illustrated herein by specific examples. The above description of examples is only intended to help the understanding of the principle and the spirit of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. A simulation system for a current collecting surface of a C-shaped contact rail, comprising an H-shaped rail and a limiting plate, wherein,
   a lower surface of the H-shaped rail comprises a first plane and a second plane,
   the first plane is parallel to a horizontal plane,
   the second plane intersects with the first plane at a first preset angle,
   the first plane has a specified length,
   the limiting plate comprises a first support, a second support, and a third support which is perpendicular to the horizontal plane,
   the first support has a first end fixed to the third support and a second end suspended, and the first support keeps level,
   the second support has a first end fixed to the third support, and the second support intersects with the horizontal plane at a second preset angle, and
   the first support is spaced from the second support by a specified distance, and an upper surface of the H-shaped rail is fixedly connected to a lower surface of the first support.

2. The simulation system for the current collecting surface of the C-shaped contact rail according to claim 1, wherein the first preset angle is 176 degrees.

3. The simulation system for the current collecting surface of the C-shaped contact rail according to claim 2, wherein the specified length is 47 mm.

4. The simulation system for the current collecting surface of the C-shaped contact rail according to claim 3, wherein the H-shaped rail is a steel-aluminum composite H-shaped rail.

5. The simulation system for the current collecting surface of the C-shaped contact rail according to claim 4, wherein the lower surface of the H-shaped rail is made of steel.

6. The simulation system for the current collecting surface of the C-shaped contact rail according to claim 5, wherein the second preset angle is 5 degrees.

7. The simulation system for the current collecting surface of the C-shaped contact rail according to claim 4, wherein the second preset angle is 5 degrees.

8. The simulation system for the current collecting surface of the C-shaped contact rail according to claim 3, wherein the second preset angle is 5 degrees.

9. The simulation system for the current collecting surface of the C-shaped contact rail according to claim 2, wherein the second preset angle is 5 degrees.

10. The simulation system for the current collecting surface of the C-shaped contact rail according to claim 1, wherein the specified distance is 190 mm.

11. The simulation system for the current collecting surface of the C-shaped contact rail according to claim 10, wherein the second preset angle is 5 degrees.

12. The simulation system for the current collecting surface of the C-shaped contact rail according to claim 1, wherein the second end of the first support further comprises a bent portion bending downwards.

13. The simulation system for the current collecting surface of the C-shaped contact rail according to claim 12, wherein the limiting plate is made of glass fiber reinforced plastic.

14. The simulation system for the current collecting surface of the C-shaped contact rail according to claim 12, wherein the second preset angle is 5 degrees.

15. The simulation system for the current collecting surface of the C-shaped contact rail according to claim 1, wherein the limiting plate further comprises a fourth support,
   the fourth support has a first end horizontally fixed to the third support, and has a second end suspended; and
   an extending direction from the first end to the second end of the fourth support is opposite to an extending direction from the first end to the second end of the first support.

16. The simulation system for the current collecting surface of the C-shaped contact rail according to claim 15, wherein the second preset angle is 5 degrees.

17. The simulation system for the current collecting surface of the C-shaped contact rail according to claim 1, wherein the second preset angle is 5 degrees.

* * * * *